(12) United States Patent
Virtanen

(10) Patent No.: US 6,503,359 B2
(45) Date of Patent: *Jan. 7, 2003

(54) MONOMOLECULAR ADHESION METHODS FOR MANUFACTURING MICROFABRICATED MULTILAMINATE DEVICES

(75) Inventor: Jorma Virtanen, Irvine, CA (US)

(73) Assignee: Burstein Technologies, Inc., Irvine, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/263,972

(22) Filed: Mar. 5, 1999

(65) Prior Publication Data

US 2002/0014306 A1 Feb. 7, 2002

(51) Int. Cl.[7] ................................................. B32B 7/00
(52) U.S. Cl. ...................... 156/310; 156/292; 428/420
(58) Field of Search ........................... 428/420; 156/310, 156/292

(56) References Cited

U.S. PATENT DOCUMENTS

| 4,032,929 A | 6/1977 | Fischbeck et al. |
| 4,612,554 A | 9/1986 | Poleshuk |
| 4,734,705 A | 3/1988 | Rezanka et al. |

(List continued on next page.)

FOREIGN PATENT DOCUMENTS

| EP | 0 392 475 A2 | 10/1990 |
| EP | 0 417 305 A1 | 3/1991 |
| EP | 0 504 432 A1 | 9/1992 |
| WO | WO 96/04547 | 2/1996 |
| WO | WO 96/09548 | 3/1996 |
| WO | WO 97/21090 | 6/1997 |
| WO | WO 98/32535 | 7/1998 |
| WO | WO 98/45693 | 10/1998 |
| WO | WO 98/53311 | 11/1998 |

OTHER PUBLICATIONS

Barltrop, J.A. et al., "Photosensitive Protective Groups," *Chemical Communications*, 22:822–823 (1966).
Chappel, P.J.C. et al., "Surface Modification of Extended Chain Polyethylene Fibres to Improve Adhesion to Epoxy and Unsaturated Polyester Resins," *Surface and Interface Analysis*, 17(3):143–150 (1991).
Newman, M.S. et al., "The Darzens Glycidic Ester Condensation," *Organic Reactions*, vol. V, Chapter 10:413–440, John Wiley & Sons, Inc., New York (1951).
Patchornik, A. et al., "Photosensitive Protecting Groups," Communications to Editor, *J. Am. Chem. Soc.*, 92(21):6333–6335 (1970).

*Primary Examiner*—John J. Gallagher
(74) *Attorney, Agent, or Firm*—Oppenheimer Wolfe & Donnelly LLP

(57) ABSTRACT

Methods for effecting monomolecular adhesion are described. Adhesion may be effected by contacting a first and second bonding surface, wherein a first reactant for a chemical bonding reaction is plurally present on the first bonding surface, a second reactant for the chemical bonding reaction is plurally present on the second bonding surface, and the surfaces are contacted for a time and under conditions sufficient to permit the chemical reaction to bond a sufficient number of first reactants to second reactants to attach the bonding surfaces. A molecular linker may optionally be used. Methods for producing multi-laminate structures, wherein successive layers are monomolecularly bonded, are described, as are multi-laminate structures so constructed. The monomolecular bonding between successive layers prevents extrusion of adhesive, obviates use of elevated temperatures to effect adhesion, and presents other advantages useful in the construction of nanoscale and microscale devices for clinical and analytic use.

72 Claims, 4 Drawing Sheets

U.S. PATENT DOCUMENTS

| | | | |
|---|---|---|---|
| 5,225,274 A | 7/1993 | Ogawa et al. | |
| 5,228,944 A | 7/1993 | Seifried et al. | |
| 5,324,543 A | 6/1994 | Ogawa et al. | |
| 5,368,942 A * | 11/1994 | Smith et al. | 428/420 |
| 5,380,585 A | 1/1995 | Ogawa et al. | |
| 5,451,459 A | 9/1995 | Ogawa et al. | |
| 5,466,486 A | 11/1995 | Ogawa et al. | |
| 5,503,704 A * | 4/1996 | Bower et al. | 428/420 |
| 5,587,128 A | 12/1996 | Wilding et al. | |
| 5,593,838 A | 1/1997 | Zanzucchi et al. | |
| 5,605,662 A | 2/1997 | Heller et al. | |
| 5,635,246 A | 6/1997 | Ogawa et al. | |
| 5,681,484 A | 10/1997 | Zanzucchi et al. | |
| 5,698,299 A | 12/1997 | Schmidt et al. | |
| 5,699,157 A | 12/1997 | Parce | |
| 5,755,913 A * | 5/1998 | Lyden et al. | 156/310 |
| 5,783,477 A | 7/1998 | Kish, Jr. et al. | |
| 5,786,057 A * | 7/1998 | Lyden et al. | 428/420 |
| 5,800,690 A | 9/1998 | Chow et al. | |
| 5,843,767 A | 12/1998 | Beattie | |
| 5,849,627 A | 12/1998 | Linn et al. | |
| 6,126,765 A * | 10/2000 | Öhman | 156/324.4 |

\* cited by examiner

MONOMOLECULAR ADHESION METHODS FOR MANUFACTURING MICROFABRICATED MULTILAMINATE DEVICES

FIELD OF THE INVENTION

The present invention relates to methods and apparatuses for effecting adhesion, and particularly to methods and apparatuses for producing multi-laminate microfabricated, including microfluidic, devices.

BACKGROUND OF THE INVENTION

Recently, techniques first developed for the manufacture of microelectronic devices have been adapted to the manufacture of a wide variety of microfluidic devices for chemical analysis and synthesis.

For example, Wilding et al., U.S. Pat. No. 5,587,128, disclose devices particularly adapted for nucleic acid amplification, constructed by fabricating flow channels and one or more reaction chambers into the surface of a planar substrate; at least one of these engineered features has a cross-sectional diameter between 0.1 µm and 1,000 µm.

Zanzucchi et al., U.S. Pat. No. 5,593,838, disclose a microlaboratory disc variously adapted for performing nucleic acid assays or immunoassays, or for synthesizing peptides, oligonucleotides, or other combinatorially-constructed small molecules. The disc comprises a plurality of modular assay units, each comprising one or more arrays of sample wells 200–750 microns deep, interconnected by one or more channels at equivalent scale. Etching from both sides of the planar substrate permits the fabrication of a more complex network of overlapping capillary channels of similar dimensions, Zanzucchi et al., U.S. Pat. No. 5,681,484.

Heller et al., U.S. Pat. No. 5,605,662, describe microfluidic devices containing matrices of micron-sized locations, each of which is underlaid with a distinct and separately addressable microelectrode. The device is adapted to drive diagnostic and synthetic reactions, including nucleic acid hybridization and immunoassays.

Parce, U.S. Pat. No. 5,699,157, describes a microfluidic system for electrophoretic analysis of materials migrating in a microchannel fabricated in a planar substrate. The microchannels, fabricated by standard photolithographic or micromachining methods, such as laser drilling, range in diameter from about 0.1 µm to 100 µm.

WO 96/04547 (Lockheed Martin Energy Systems) describes a microchip laboratory system with micron-sized channels fabricated using standard photolithographic procedures and chemical wet etching, for use in capillary electrophoresis, DNA sequencing, gradient elution liquid chromatography, flow injection analysis, and chemical reaction and synthesis.

Chow et al., U.S. Pat. No. 5,800,690 describe microfluidic systems fabricated with a plurality of electrodes at nodes of a two-dimensional network of interconnecting capillary channels etched into a planar substrate; the electrodes create electric fields that move fluid-entrained materials electrokinetically through the channels.

Although the microfabrication techniques designed for semiconductor manufacture have proven useful in the precise fabrication of micron and sub-micron channels, wells, and other etched features in planar substrates, these techniques have not proven sufficient for completing the manufacture of many of these microfluidic systems. In particular, the techniques of photolithography, micromachining, vapor deposition and the like have proven ill-suited to the manufacture of microscopic features that are fluidly sealed.

Thus, to convert channels and wells into fluidly sealed capillaries and chambers, respectively, Wilding, U.S. Pat. No. 5,587,128, directs, without further explanation, that a cover be adhered or clamped to the planar substrate into which the engineered features have been etched. Chow et al., U.S. Pat. No. 5,800,690, and Parce, U.S. Pat. No. 5,699,157, analogously teach that a planar cover element be laid over the channeled substrate, and suggest generally that the planar cover element be attached to the substrate by thermal bonding, application of adhesives, or by natural adhesion between the two components.

But each of these proposed approaches—thermal bonding, application of adhesives, or natural (direct) adhesion—presents difficulties.

Although thermal bonding may be effective, sealing must be achieved at a temperature sufficiently low as to avoid distortion or destruction of the underlying substrate or substrate-embedded features. When the substrate and cover are silicon or glass, Zanzucchi et al., U.S. Pat. No. 5,593,838, teach that localized application of electric fields permits the meltable attachment of the cover element at about 700° C., well below the flow temperature of silicon (about 1400° C.) or of Corning 7059 glass (about 844° C.) WO 96/04547 (Lockheed Martin Energy Systems) teaches that a cover plate may be bonded directly to a glass substrate after treatment in dilute $NH_4OH/H_2O_2$, followed by annealing at 500° C., well below the flow temperature of silicon-based substrates.

Recently, however, microfluidic laboratories have been proposed that may be constructed using plastic substrates. See, e.g., WO 97/21090 and WO 98/53311 (Gamera Bioscience); WO 96/09548 (Molecular Drives); EP A 0392475, EP A 0417305, and EP A 0504432 (Idemitsu). International applications published as WO 98/01533, WO 98/37238, and WO 98/38510, describe aspects of microfluidic platforms that are particularly adapted for detection by optical disk readers, such as CD and DVD readers; these assay disks are, accordingly, typically constructed using techniques and materials first developed in the optical disk arts. The plastics so used may melt or deform at temperatures far below those tolerated by silicon and glass.

There thus exists a need in the art for adhesion methods that permit lamination at temperatures sufficiently low as to prevent deformation or melting of plastic substrates. Furthermore, adhesion must be achieved at temperatures that prevent denaturation of biological macromolecules, such as antibodies, that may be disposed in and upon such substrates.

WO 98/45693 (Aclara Biosciences) discloses, inter alia, a thermal bonding method for fabricating enclosed microchannel structures in polymeric, particularly plastic, substrates. After apposing the planar surfaces of the two adherends, the temperature is maintained above the glass transition temperature of the polymer for a time sufficient to allow the polymer molecules to interpenetrate, and thus to bond, the two surfaces. Although the temperatures used are lower than those used in thermal bonding of semiconductors, the approach requires that the apposing planar surfaces of the base plate and cover be made of similar polymeric materials, and the temperatures may still be sufficient to cause deterioration of the optical properties at the interface. There thus still exists a need for a method of low temperature bonding that permits the adhesion of laminae of dissimilar polymeric materials without substantial optical distortion at the bonding interface.

Lamination using adhesives presents its own problems, principal among which is the potential for extrusion of adhesive from the bonding interface into the microfabricated channels and chambers formed between the laminae.

Beattie, U.S. Pat. No. 5,843,767, teaches that such extrusion may be prevented by the laser ablation of adhesive from selected areas of one of the adherends prior to adhesion. The prior ablation adds an additional fabrication step to the process, however, and serves to reduce the bonded surface area. WO 98/45693 (Aclara Biosciences) proposes to prevent extrusion by applying adhesive in a film no more than 2 μm thick, and in fluid curable embodiments further to control extrusion by rendering the adhesive nonflowable by partial curing before apposition of adherends. Each of these latter approaches requires careful attention to process.

There thus exists a need in the art for lamination methods that more readily prevent extrusion of adhesive from between adherent laminae and that may be used in a rapid process.

Bonding of laminae using adhesives presents other problems as well, many of which are exacerbated at microfabrication scale.

For example, physical application of such small volumes of adhesive may prove difficult, particularly within the temporal limits imposed by the induction time and curing time of a fluid-phase adhesive. Furthermore, as the thickness of the adhesive layer decreases, the probability increases that the adhesive layer will include tiny pinhole areas lacking adhesive coating. These uncoated areas may be subject to chemical attack, which can weaken the bonding interface. There thus exists a need in the art for adhesives that are more readily and uniformly applied to surfaces of small scale adherends, and that lack the temporal restraints—that is, limited potlife—imposed by induction and curing of standard fluid-phase adhesives.

Direct adhesion of planar surfaces, which has been described particularly in the bonding of semiconductor wafer surfaces, presents yet other problems. Direct wafer bonding is effectuated by oxidizing the surfaces of mirror polished silicon wafers, then fusing the oxidized (glass) surfaces at high temperature (400° C.–1,200° C.) with application of external uniaxial pressure to create covalent bonds between the wafers. See Kish et al., U.S. Pat. No. 5,783,477. This process relies, however, upon the intrinsic behavior of the silicon surfaces, and is therefore limited in the types of materials that may be bonded and in the bond strengths obtainable.

Linn et al., U.S. Pat. No. 5,849,627, describe a modification of the wafer bonding approach in which further application of an aqueous oxidizing solution between the wafers during the annealing step adds a further redox reaction to the standard reaction of silicon dioxide surfaces. The addition of the further reactant permits slight reduction in the annealing temperature and allows variation in the bond chemistry and strength between the wafers. Nonetheless, the chemistries described are adapted particularly to bonding silicon surfaces, and the temperatures required for annealing remain high (800° C.–1000° C.).

There thus exists a need in the art for adhesion methods that allow close, preferably monomolecular, bonding of surfaces that are not necessarily silicon-based, and that may comprise dissimilar polymeric substrates. There further exists a need for direct adhesion methods that permit annealing at temperatures below the deformation or melting temperatures of standard plastics.

Apparatuses for effecting continuous production of laminated bodies have been described. Seifried et al., U.S. Pat. No. 5,228,944; Schmidt et al., U.S. Pat. No. 5,698,299. Schmidt et al. particularly describe continuous manufacture of microfluidic devices by registrable superimposition of patterned microfabricated laminae. In each of these approaches, however, laminae are bonded by standard thermal adhesion or fluid adhesive methods, importing into the continuous manufacturing processes the shortcomings concomitant to such adhesive methods. There thus exists a need for methods and apparatuses for effecting continuous production of laminated bodies using low temperature direct adhesion of laminae.

SUMMARY OF THE INVENTION

The present invention solves these and other problems in the art by presenting low temperature adhesion methods that bond surfaces of various composition monomolecularly at low temperature. The invention is based, in part, upon the novel recognition that direct adhesion may be effected between two macroscopic adherends by separately rendering each bonding surface competent to contribute a reactant to a chemical bonding reaction; when a sufficient density of reactive groups have been disposed upon the bonding surfaces, the formation of a large number of chemical bonds between the two surfaces after contact suffices directly to affix the adherends to one another. If one or both surfaces, by virtue of their composition, inherently displays a sufficient density of an appropriate reactant, a separate step need not be performed to render the surface competent for adhesion.

Thus, in a first aspect, the invention provides a method of attaching a first bonding surface to a second bonding surface, comprising the step of contacting the first bonding surface to the second bonding surface, wherein a first reactant for a chemical bonding reaction is plurally present on the first bonding surface, a second reactant for the chemical bonding reaction is plurally present on the second bonding surface, and the surfaces are contacted for a time and under conditions sufficient to permit the chemical reaction to bond a sufficient number of first reactants to second reactants to attach the first bonding surface to said second bonding surface.

The method may further comprise the antecedent step of disposing upon the first bonding surface a plurality of the first reactant, and may also comprise the additional step, prior to contacting the bonding surfaces, of disposing upon the second bonding surface a plurality of the second reactant. In preferred embodiments of these latter methods, the derivatization step includes exposure of at least one of the bonding surface to a gas plasma, such as ammonia plasma, oxygen plasma, and halogen plasmas; exposure to anhydrous ammonia plasma particularly may be used to aminate the bonding surface for reaction with epoxide groups presented by the second bonding surface.

The chemical reaction that bonds the adherend surfaces may form covalent bonds, hydrogen bonds, ionic bonds, or dative bonds. Covalent bonds are preferred for strong adherence. Dative, or coordinate bonds, also prove useful, particularly when such bond includes coordination of a metal, particularly coordination of gold by free sulfhydryl group.

In a second aspect, the invention provides a method of attaching a first bonding surface to a second bonding surface, comprising the step of contacting the first bonding surface to the second bonding surface in the presence of a linker molecule, wherein a first reactant for a first chemical bonding reaction is plurally present on the first bonding surface, a first reactant for a second chemical bonding reaction is plurally present on the second bonding surface, wherein the linker includes a second reactant for the first chemical bonding reaction and a second reactant for the second chemical bonding reaction, and the surfaces and linker are contacted for a time and under conditions sufficient to permit the first and second chemical reactions to bond the linker concurrently to both first and second bonding surfaces in numbers sufficient to attach the first bonding surface to the second bonding surface.

This second method may further comprise the antecedent step of disposing upon the first bonding surface a plurality of the first chemical reaction first reactant, and optionally a further step, before the contacting step, of disposing upon the second bonding surface a plurality of the second chemical reaction first reactant. In preferred embodiments of these latter methods, the derivatization step includes exposure of at least one of the bonding surface to a gas plasma, such as ammonia plasma, oxygen plasma, and halogen plasmas; exposure to anhydrous ammonia plasma particularly may be used to aminate the bonding surface for reaction with epoxide groups presented by the linker molecule.

By analogy to the methods of the first aspect of this invention, the chemical reaction that bonds the adherend surfaces may form covalent bonds, hydrogen bonds, ionic bonds, or dative bonds. Covalent bonds are preferred for strong adherence. Dative, or coordinate bonds, also prove useful, particularly when such bond includes coordination of a metal, particularly coordination of gold by free sulfhydryl group.

Although uniform application of the linker to one of the two bonding surfaces will, after complete reaction, effectively recreate the adhesive geometry presented by the methods of the first aspect of the invention in which the bonding surfaces are competent to bind directly to one another, nonuniform application of the linker to an adherend surface creates one or more discrete spots on that surface that is capable of contributing to a bond. The creation of spatially-directed bonding locations permits "spot-welding" of adherends, which may provide certain structural benefits to the microfabricated object by providing nonbonded areas to relieve stress; additionally, the creation of spatially-directed bonding locations permits the directed attachment of microfabricated components to the surface of the adherend.

The methods of the present invention permit the low temperature adhesion of surfaces of various compositions. Thus, in particular embodiments, at least one of said bonding surfaces is of an adherend consisting essentially of plastic. In a preferred embodiment, the plastic is polycarbonate or polystyrene. In other embodiments, at least one of said bonding surfaces is of an adherend consisting essentially of metal, preferably gold. The methods thus readily permit the application of metal foils to formed plastics, which proves useful in the rapid and continuous manufacture of optical disks and microfabricated analytical devices readable by optical disk readers.

The methods are not limited to planar substrates. Thus, the bonding surface of at least one of the adherends may include features that are nonplanar with the bonding interface; such nonplanarities may include channels, wells, or the like etched or micromachined into the surface, permitting the construction of microfluidic devices. Thus, in certain embodiments of the adhesion methods of the present invention, at least one of the bonding surfaces includes nonplanarities with the bonding interface, such as features etched or micromachined from the surface into the substrate of the adherend. In preferred embodiments, the attachment of the second adherend fluidly encloses the nonplanar feature. Alternatively or additionally, the nonplanarities may digitally encode information; in preferred embodiments, that digitally encoded information, for example in the form of pits or grooves, is readable by an optical disk reader. In yet other embodiments, at least one of said bonding surfaces has analyte-specific signal elements disposed thereon, preferably analyte-specific signal elements readable by an optical disk reader.

The methods for adhering a first bonding surface to a second bonding surface may readily be used in the manufacture of multilaminate structures.

Thus, in another aspect, the invention provides a method for constructing a multilaminate structure, the method comprising at least one iteration of the step of: attaching a first adherend to a second adherend, the attached adherends serving as first adherend in any subsequent iteration of the step, wherein the attaching step is performed by contacting a bonding surface of the first adherend to a bonding surface of the second adherend, wherein a first reactant for a chemical bonding reaction is plurally present on the first adherend bonding surface, a second reactant for the chemical bonding reaction is plurally present on the second adherend bonding surface, and the surfaces are contacted for a time and under conditions sufficient to permit the chemical reaction to bond a sufficient number of first reactants to second reactants to attach the first adherend bonding surface to the second adherend bonding surface.

The invention provides a further method for constructing a multilaminate structure, the method comprising at least one iteration of the step of: attaching a first adherend to a second adherend, the attached adherends serving as first adherend in any subsequent iteration of the step, wherein the attaching step is performed by contacting a bonding surface of the first adherend to a bonding surface of the second adherend in the presence of a linker molecule, wherein a first reactant for a first chemical bonding reaction is plurally present on the first adherend bonding surface, wherein a first reactant for a second chemical bonding reaction is plurally present on the second adherend bonding surface, wherein the linker includes a second reactant for the first chemical bonding reaction and a second reactant for the second chemical bonding reaction, and the surfaces and linker are contacted for a time and under conditions sufficient to permit the first and second chemical reactions to bond the linker concurrently to the first adherend surface and the second adherend surface in numbers sufficient to attach the first adherend to the second adherend.

The invention provides, in another aspect, a multilaminate structure produced by at least one iteration of either of these processes.

The methods of the present invention are particularly suitable and present significant advantages for use in rapid continuous laminating processes in which adherends, usually formed as flexible sheets or films, are contacted progressively in a continuous fashion.

Thus, in yet another aspect, the invention provides a method of manufacturing a multilaminate structure, the method comprising at least one iteration of the step of: attaching a first adherend to a second adherend, the attached adherends serving as first adherend in any subsequent iteration of the step, wherein the attaching step is performed by progressively contacting a bonding surface of the first adherend to a bonding surface of the second adherend, wherein a first reactant for a chemical bonding reaction is plurally present on the first adherend bonding surface, a second reactant for the chemical bonding reaction is plurally present on the second adherend bonding surface, and the surfaces are contacted for a time and under conditions sufficient to permit the chemical reaction to bond a sufficient number of first reactants to second reactants to attach the adherends.

The invention further provides a second method for manufacturing a multilaminate structure, the method comprising at least one iteration of the step of: attaching a first adherend to a second adherend, the attached adherends serving as first adherend in any subsequent iteration of the step, wherein the attaching step is performed by progressively contacting a bonding surface of the first adherend to a bonding surface of the second adherend in the presence of a linker molecule, wherein a first reactant for a first chemical bonding reaction is plurally present on the first adherend bonding surface, wherein a first reactant for a second chemical bonding reaction is plurally present on the second adherend bonding surface, wherein the linker includes a second reactant for the first chemical bonding reaction and a second reactant for the second chemical bonding reaction, and the surfaces and linker are contacted for a time and under conditions sufficient to permit the first and second chemical reactions to bond the linker concurrently to the first adherend surface and second adherend surface in numbers sufficient to attach the adherends.

BRIEF DESCRIPTION OF THE DRAWINGS

These, and other aspects of the present invention, can best be understood by reference to the drawings, in which.

DETAILED DESCRIPTION OF THE INVENTION

Figure 1:
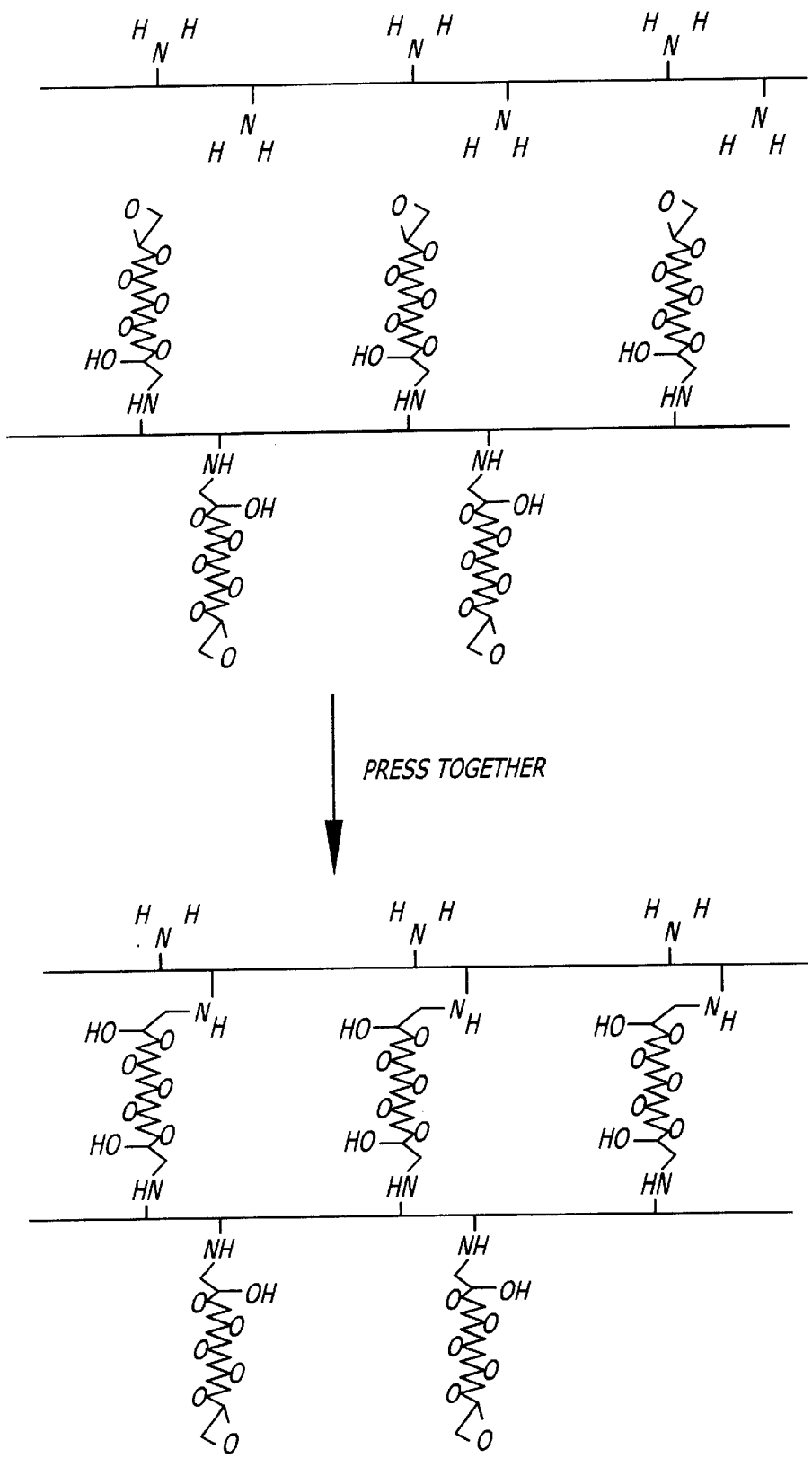
FIG. 1 schematizes a process for directly adhering two laminae using an exemplary chemistry of the present invention, in which each bonding surface is first separately rendered competent to contribute a distinct reactant to an epoxide ring-opening by an amine reaction, the formation in parallel of a large number of amino-alcohol covalent bonds across the bonding interface thereafter sufficing directly to affix the adherends to one another.

In order that the invention herein described may be fully understood, the following detailed description is set forth.

Unless otherwise specified, terms used in the description have their usual and customary meanings. In the adhesive arts, such usual and customary meanings will be found, inter alia, in Skeist, I. (ed.), *Handbook of Adhesives,* 3rd ed., New York: Van Nostrand Reinhold Co., 1990 and Donatas, S. (ed.) *Handbook of Pressure Sensitive Adhesive Technology,* New York: Van Nostrand Reinhold Co., 1989, which are incorporated herein by reference. The term "adherend" as used herein refers to any object that is to be bonded, permanently or transiently, by the methods of the present invention; a surface of the adherend that is to participate in the bonding is referred to herein as the adherend's "bonding surface"; between the bonding surfaces of adherends that have been so bonded is found the "bonding interface."

The present invention is based in part upon the novel recognition that direct adhesion may be effected between two macroscopic adherends by separately rendering each bonding surface competent to contribute a reactant to a chemical bonding reaction; when a sufficient density of reactive groups have been disposed upon the bonding surfaces, the formation in parallel of a large number of chemical bonds between the two surfaces suffices directly to affix the adherends to one another. In a preferred approach, the chemically-reactive groups are disposed directionally upon the surface of the adherends, imposing geometric constraints upon the bonding process that facilitate manufacture of multilaminate structures.

Thus, in a first aspect, the invention provides methods for adapting chemistries that are useful in the covalent (or strongly noncovalent, such as ionic, dative or coordinate, or hydrogen) bonding of individual molecules to the attachment of entire macromolecular surfaces. This direct bonding approach, applicable to a wide variety of substrate compositions, obviates the need for fluid-phase adhesives or for thermal bonding at elevated temperatures.

Although an enormous variety of chemical bonding chemistries prove useful in the practice of the invention, those chemistries presently used in fluid-phase epoxy adhesives prove particularly useful, and thus may conveniently be used here to exemplify this aspect of the invention.

Two-component epoxy glues contain an epoxy base (resin) and a hardener (curing agent) that are mixed together immediately prior to application to adherend surfaces.

The curing agent hardens the epoxy resin by reacting with the epoxide group in a ring-opening reaction as generalized below:

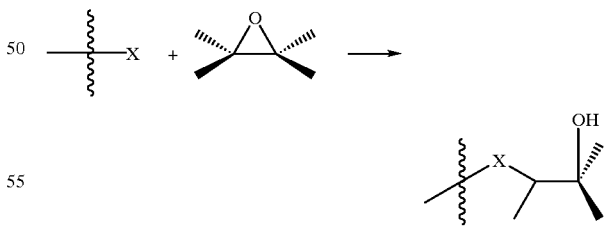

where —X is the hardener. The resulting hardened resin is a covalently bonded polymer that is adherent to and that bridges the space between the two adherends. The resins and hardeners are typically bi-functional, having either two epoxide groups per molecule (resins) or two ring-opening elements per molecule (hardeners).

There are many types of epoxy resins. Common resins include glycidyl ethers, glycidyl esters, glycidyl amines, epoxidated diene polymers, and cycloaliphatic epoxy resins.

Among these, glycidyl ethers are the most common, particularly the glycidyl ethers of Bisphenol A, Bisphenol F, and Novolac™ epoxy resins. Bisphenols A and F have the structure

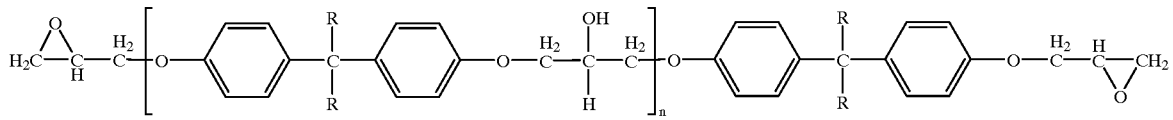

where R is $CH_3$ for Bisphenol A and R is H for Bisphenol F. Novolac™ epoxy resin has the structure

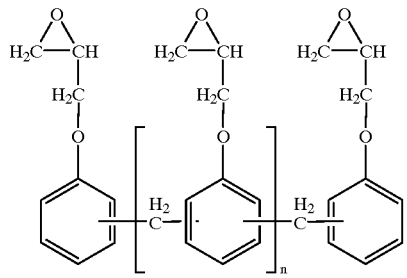

Bisphenol A resins are by far the most common accounting for more than 95% of commercial epoxy resins. These resins are very pH and temperature resistant and remain intact under normal conditions. Bisphenol A resins will, unless diluted or altered, typically handle 70% sulphuric acid and temperatures of 150–200 degrees Fahrenheit. Novolac™ resins will handle 98% sulphuric acid and temperatures of 400–500 degrees Fahrenheit. Bisphenol-F resins fall between the two.

Structurally, most epoxies are formed from straight molecular hydrocarbon polymers. Higher quality epoxies use ring shape molecules, particularly aromatic and cycloaliphatic hydro carbons and polyamines, typically have one epoxide moiety per monomer unit, rather than one epoxide moiety on each end of the molecule as in lower quality epoxy resins. In this context, "higher quality" means more resistant to high temperatures and high humidities.

While all epoxies are brittle (2–3% ultimate elongation, i.e., elongation prior to breakage), the ring epoxies generally have ultimate elongations of 7–9%. Special additives can increase epoxy elasticity significantly, but the additives often interfere with or reduce other desired properties, such as tensile and compressive strengths.

Typical hardeners include amine derivatives, polysulfides, amides, anhydrides, and formaldehyde mixtures with amines and alcohols. The most common hardeners are polyamides and aliphatic amines. Polyamides are available in a wide variety of molecular weights and chemical structures. Since the numerous amine groups of the polyamide backbone react with the epoxide groups of the resin but do not self-react, the mix ratio of resin to hardener is not critical. Polyamides also have a long shelf-life, but they exhibit poor temperature resistance.

By contrast, aliphatic amines, typified by diethylene triamine (D.E.H. ™; Dow Chemical Company), triethylene amine (Amicure™; Pacific Anchor Chemical Company), and aminoethyl piperazine (Epo-Tuf™; Reichhold Chemical), are very temperature resistant. They also have low formulations costs and are fast-curing at ambient temperatures. However, these hardeners have critical mix ratios and are strong skin irritants.

Special additives are often included in standard fluid-phase two-component epoxy glues to provide special properties and to thicken or thin the glue or its components (e.g., lead, Kevlar, nylon). Other additives, such as calcium salts, chopped glass or silica, and metallic powders serve to decrease the heat dissipated during the reaction and increase strength and resistance to abrasion. Another common additive is an "elastomeric modifier", which serves to increase ultimate elongation. These modifiers are usually rubber derivatives. By far the most common are polybutadiene resins (Hycar Reactive Liquid Polymers™; B.F. Goodrich Company). Sometimes additives are also used to simply lower the cost. Epoxy formulators can select from several different epoxy bases, curing agents, and additives.

These chemistries are adapted for use in the methods of the present invention by separately rendering each of the bonding surfaces competent to contribute a reactant to the epoxide ring-opening reaction. Thus, in the simplest embodiment of the method, schematized in FIG. 1, primary amines are disposed at high density upon the bonding surface of one adherend and epoxide moieties are disposed upon the bonding surface of the other adherend. When the two bonding surfaces are thereafter directly contacted, the ring-opening reaction proceeds with the formation of a high density of amino-alcohol covalent bonds, thus causing direct covalent bonding of the two adherends.

The first step in this process is the introduction of reactive groups separately onto the bonding surfaces of the two adherends to render them adhesively competent. As would of course be understood, the exact means for introducing reactive groups will depend upon both the starting composition of the bonding surface and the desired final composition.

For example, in the construction of devices particularly adapted for detection using optical disk readers, as are described inter alia in International applications published as WO 98/01533, WO 98/37238, and WO 98/38510, incorporated herein by reference, at least one adherend will often be composed of plastic, such as polyethylene, polypropylene, polyacrylate, polymethylmethacrylate, polyvinylchloride, polytetrafluoroethylene, polystyrene, polycarbonate, polyacetal, polysulfone, celluloseacetate, cellulosenitrate, or mixtures thereof. In such cases, reactive groups may be incorporated during polymerization of the plastic itself, either within the polymeric backbone or by incorporation of additives to be embedded within the polymer matrix. Alternatively, the necessary chemically reactive groups may be disposed upon the solidified plastic substrate by derivatization of the bonding surface. This latter approach—surface derivatization—will generally be employed when the adherend is composed of nonpolymeric materials such as silicon, polysilicon, quartz, glass, or ceramic.

For the epoxy ring opening by amine chemistry (also abbreviated "epoxyamine" herein) schematized in FIG. 1, primary amino groups may be added to the surface of a second plastic or silicon-based adherend by several means, including ammonia plasma-etching, nitration followed by reduction, addition of cyanate to form nitriles followed by reduction, additions of sodium azide followed by addition of nitrous acid and subsequent hydrolysis, or addition of hydrazine followed by subsequent modifications of the amine. All such reactions are well known in the art, and other chemistries will readily suggest themselves to one skilled in the art. A particularly preferred approach for aminating a bonding surface is exposure of the surface to anhydrous ammonia plasma, as depicted schematically in FIG. 2. Ammonia plasma treatment introduces amine groups at uniformly high density, Chappell et al., *Surf. Interface Anal.* 17:143 (1991); the plasma easily reaches and derivatizes portions of the surface that may, by virtue of features microfabricated thereon, be more difficult to reach with fluid-phase chemical approach.

Plasma-generating vacuum chambers coupled to an electrical discharge system for ionizing the gas are readily available from a variety of commercial sources, including Advanced Plasma Systems, Inc. (St. Petersburg, Fla.); ENI Corporation (Rochester, N.Y.); Plasma Systems, Inc. (San Jose, Calif.); Plasma Etch, Inc. (Carson City, Nev.); Surface Technology Systems Limited (South Wales, UK); and Thermal Conversion Corp. (Kent, Wash.). Thermal Conversion Corporation manufactures a continuous-feed, gas-phase reactor that is particularly useful in the continuous fabrication methods further described below. The system is inductively or capacitively coupled to provide the source for the electrical discharge. Operation occurs at variable discharge frequencies most advantageously between 150 kHz and 13.6 MHz.

For the epoxy ring opening by amine chemistry schematized in FIG. 1, epoxide groups may be added to the surface of a plastic or silicon-based adherend by application of surface active compounds such as addition of meta-chloroperoxybenzoic acid or other peroxyacid, formation of halohydrins followed by treatment with base, epoxidation of electrophilic alkenes by treatment with peroxides, sulfur ylides reaction with carbonyls, or epoxide ester formation using the Darzens reaction, M. S. Newman and B. J. Magerlein, *Org. React.* 5: 413 (1951). All such reactions are well known in the art, and other chemistries will readily suggest themselves to one skilled in the art. One preferred approach, as further discussed below, is to dispose epoxide groups upon the surface by first aminating the surface, then reacting the surface with bis-epoxy-polyethylene glycol (bis-epoxy-PEG).

Once the bonding surfaces are rendered competent for adhesion—as, for example, by separate disposition of epoxide and amine groups, respectively—the adherends may be stored for future use, or may immediately thereafter be reacted with one another to complete the adhesive process. It should be appreciated that some bonding surfaces, by virtue of their inherent composition, will not require as a separate step the application of reactive groups.

A wide variety of other chemistries may readily be adapted for use in this method of direct adhesion, wherein each bonding surface is first separately rendered competent to contribute a reactant to bond formation, the formation in parallel of a large number of bonds across the bonding interface thereafter sufficing directly to affix the adherends to one another. For example, other widely-used epoxy resins, such as bisphenol A and epichlorohydrin, may be used in lieu of bisepoxy PEG. Other variations on the ring-opening attachment method analogous to the ring-opening of an epoxide by an amine include reaction of carboxylic acids with polyepoxides to form hydroxylated esters and reaction of carboxylic acids with cyclic amines to form amine-linked esters.

The principle may be extended beyond epoxy or other ring-opening chemistries to include, e.g., reaction of carboxylic acids with diamines to form amides; reaction of carboxylic acids with polyalcohols to form esters; reaction of activated carbon atoms, such as carbanions, with diisocyanates to form amides; any reaction that results in the formation of a carboxylic, phosphoric, sulfonic or sulfuric anhydride, such as reaction of a carboxylic acid with an acid chloride to form a carboxylic anhydride; reaction of alcohols with isocyanates to form urethanes; reaction of amines with isocyanates to form urea linkages; reaction of amines or hydrazines with aldehydes or ketones; reaction of mercaptans with maleimides; oxidation of two mercaptans to form a sulfur-sulfur bond; and reaction of dienes with dienophiles.

Furthermore, one or more of the reactive groups may be chemically protected. The protective group may be removed immediately before the two adherends are brought into contact, or even after they have been compressed against each other. Protective groups can be removed chemically, biochemically, electrochemically, photochemically or thermally. Various protective groups are well known in the art of organic chemistry (Greene and Wuts, *Protective Groups in Organic Synthesis,* $2^{nd}$ ed., 1991, John Wiley & Sons). Such protective groups find particular advantage in chemistries in which reactive groups are self-reactive; addition of a protective group renders the adherend non-self-reactive and suitable for storage.

The principle may also be extended to include chemistries that have been described for the successive application of chemically adsorbed films, but which have not hitherto been recognized as suitable for adhering a first solid substrate surface to a second. Ogawa et al., U.S. Pat. Nos. 5,635,246, 5,466,486, 5,451,459, 5,324,543, 5,380,585, and 5,225,274.

No matter what the chosen chemistry, each bonding surface is first rendered competent to contribute a reactant to the chosen bonding reaction, either by its inherent composition or by subsequent disposition of reactive groups upon the bonding surface.

In the latter case, where the adherend substrate is not inherently reactive, reactive groups may be introduced onto the surface by techniques well known in the art, for example by the mixing of surface active compounds such as polyethylene glycol ammonium halogenide with a polymer; by ammonia, oxygen, halogen or other reactive plasma etching; or by wet chemical reaction, such as acid or alkaline hydrolysis, nitration and subsequent reduction; or by attachment of zirconates, titanates, zircoaluminates, or chromium compounds. Preferred approaches use ammonia, oxygen, and halogen plasmas, which variously introduce amine groups and oxygenated functional groups such as alcohols, aldehydes, carboxyl groups, and halogen groups, respectively. Chappell et al., *Surf. Interface Anal.* 17:143 (1991). Glass surfaces can be derivatized directly with silylchlorides or their derivatives. Glass can also be activated by hydrochloric or hydrofluoric acid or by bases. The bonding surface should contain a sufficient density of reactive groups to ensure subsequent macroscopic adhesion.

Several advantages of the direct bonding method of the present invention should be readily apparent.

First, the use of fluid-phase adhesives is obviated, thereby eliminating the potential extrusion of adhesive from the bonding interface into microfabricated features such as channels formed in or between the adherends. Although the derivatization of one or both adherend surfaces may itself be effected by application of chemicals in fluid solvent, washing and drying of the surface prior to adhesion will prevent extrusion.

Second, the elevated temperatures required by thermal bonding may be obviated.

Third, the ability to direct the orientation of the bonding reaction provides significant advantages in manufacture of multilaminate structures. Taking the epoxy ring opening by amine reaction depicted in FIG. 1 as an example, it should be apparent that the animated bonding surface will not adhere to itself. Where such an animated adherend is a flexible sheet, such as a thin plastic film, it may as a consequence be reversibly rolled upon itself without self-adherence, which has utility in continuous manufacturing processes, as further detailed below. Furthermore, each side of such a film may be separately and distinctly derivatized, permitting the directed and oriented construction of multilaminate devices.

Figure 4:
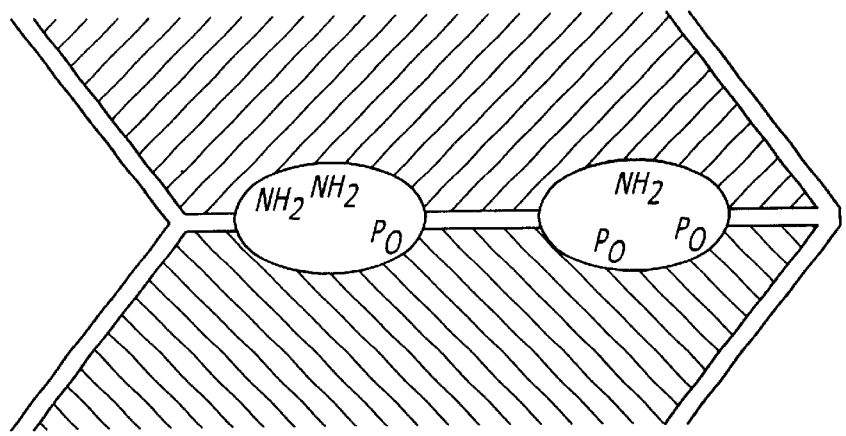
FIG. 4 is a side cross-sectional view through a bilaminate microfabricated structure assembled using the method of FIGS. 1–3, demonstrating the distribution of reactive moieties on the internal surface of capillaries and chambers formed in the bonding interface between two microfabricated adherends.

It should be apparent, too, that when a microfabricated capillary or chamber is rendered fully enclosed by the present bonding process—that is, when a channel or well microfabricated into an adherend becomes fluidly sealed by the bonding of a second adherend—the internal surfaces of the capillary will bear chemically reactive functional groups contributed by each of the adherends, as yet unreacted due to spatial separation. Thus, as depicted in FIG. 4, when a first adherend contributes reactive primary amines to the bonding reaction and the second adherend contributes opoxides, the internal surface of the capillary will display both amines and epoxides. These groups remain available for the subsequent attachment of molecules that desirably may be used for analysis or synthesis. For example, the reactive groups permit the attachment of nucleic acids for hybridization assays and immunoglobulin for immunoassays. Of course, such analyte-specific molecules may be attached to one or both of the bonding surfaces in a patterned fashion, for example by ink-jet printing, before bringing the two adherend bonding surfaces together.

A further advantage of the methods described herein is that uniform derivatization of the bonding surfaces by exposure to reactive gas plasma substantially eliminates the problem of pinhole areas of noncoverage that attend efforts to apply liquid adhesives in thin films.

Further, it should be appreciated that the methods described above are not limited to substrates that are completely planar. Thus, the bonding surface of at least one of the adherends may include features that are nonplanar with the bonding interface; such nonplanarities may include channels, wells, or the like etched or micromachined into the surface, permitting the construction of microfluidic devices. The methods may even be applied to substrates that are not principally or even substantially planar. For example, the methods described herein may readily be adapted to the construction of microfluidic devices that are heavily etched, such as those employing the etched microspacer or post geometry described in WO 98/32535 (Lindberg et al.). The methods described herein may also be adapted readily to permit attachment of particles, such as plastic spheres, to planar or nonplanar surfaces.

Yet another advantage of the above-described approach is that temporal restraints that inhere in the use of liquid glues, and particularly in the use of two-component liquid epoxies, are eliminated. The "potlife" of a two-part epoxy is defined as the time that the adhesive can be worked before it begins to harden; the "cure time" is the time it takes the epoxy to harden. Desired are epoxy glues that have long potlife but short curing times. This has proven difficult to achieve. While it is easy to shorten or to lengthen both potlife and cure time by changing temperature, it has proven exceedingly difficult to lengthen potlife while retaining a usefully short cure time.

The approach described herein, however, completely segregates the potlife from the cure time by segregating the processes by which adhesive competency is created, on the one hand, from the actual adhesive event itself on the other. Thus, as noted above, the bonding surfaces may be contacted immediately after being rendered competent, or may, alternatively, be stored prior to contact; depending on the stability of the chemically active moiety, the adhesively competent adherend may be stored for long periods.

In addition, the method of the present invention eliminates the requirement imposed by two component epoxy glues that the reactants be admixed in carefully prescribed ratios; in the present method, a relative excess of one or the other reactant will not interfere with efficient bond formation across the bonding interface.

Finally, the above-described approach bonds the two adherend surfaces monomolecularly, that is, with just a single molecule bridging the adhesion interface. The monomolecular fusion that is effected between the two bonding surfaces ensures that voids created in the bonding interface between the bonding surfaces are fluidly sealed. The close apposition of the adherends further accommodates reductions in the scale of microfluidic elements that will likely be achieved in the future.

In a variation of the above-described approach, each bonding surface may be rendered competent to contribute a reactant to bond formation with a bifunctional linker rather than directly with the other adherend; it is the linker that bridges the bonding interface and effects the adhesion.

In one embodiment of this approach, each of the bonding surfaces is animated, and the linker is a derivative of bisepoxy-polyethylene glycol (bisepoxy-PEG). The animated surfaces are readily produced by exposure to ammonia plasma, are mutually nonreactive, and are stable to storage. The linker backbone is PEG, which offers the advantages of rendering the linker readily soluble in aqueous solution and providing ease of synthesis to chosen length.

Other illustrative chemistries are shown in the formulae below, in which the first and third reactant represent chemically reactive groups disposed upon the bonding surface of a first and second adherend, respectively, and the middle reactant represents a bifunctional linker. The R group in each of the linkers is preferably an alkyl chain or alkyl derivative, and more preferably is polyethylene glycol (PEG) or a derivative thereof.

Activated Carbon Atoms plus Diisocyanates

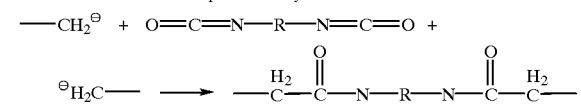

Anhydride Formation

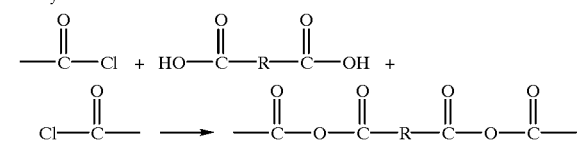

Alcohols plus Diisocyanates

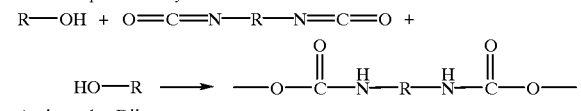

Amines plus Diisocyanates

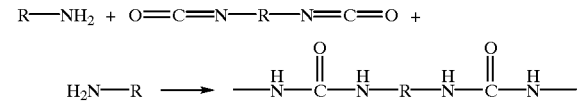

-continued

Carboxylic Acids plus Polyepoxides

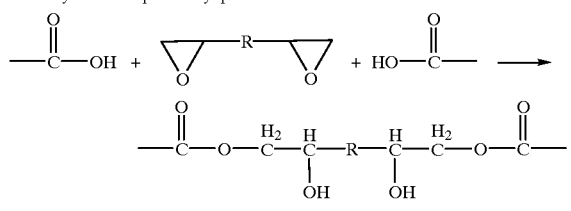

Carboxylic Acids plus Cyclic Ammes

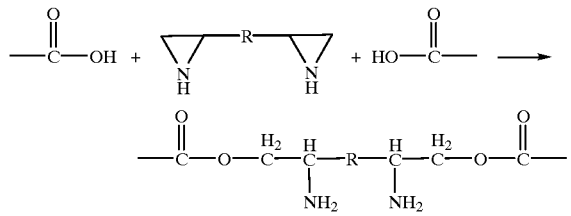

Carboxylic Acids plus Diamines

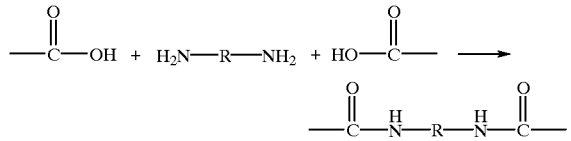

Carboxylic Acids plus Polyalcohols

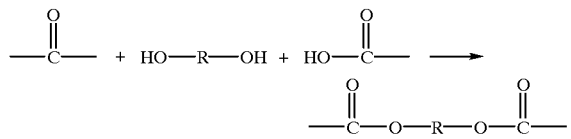

In each of the above examples, the adherend bonding surfaces are shown as identically derivatized and mutually unreactive. The linker, which is required to effect the bonding, is shown as symmetric: that is, with two identical reactive groups for bonding to the adherend surfaces. As would be readily apparent, this geometry permits the symmetrical bifunctional linker to crosslink reactive groups on a single bonding surface; such a side reaction does not contribute to bonding between the adherends. In cases of symmetrical bifunctional linkers, therefore, the linker would preferably be applied in a concentration sufficiently high as to diminish the crosslinking of reactive groups on a single bonding surface.

Furthermore, although shown as bifunctional linkers having only two reactive groups, it should be apparent that the linkers may optionally also possess additional functional groups or moieties. The linker may, for example, possess a plurality of reactive groups suitable to contribute to the binding reaction. The linker may also possess other types of functional groups, such as those that increase or decrease solubility, adjust hydrophobicity, alter thermal or electrical properties, or permit polymerization. Non-limiting examples of such groups or moieties are: methyl, ethyl, i-propyl, phenyl, hydroxyl, carboxyl, sulphonyl, thiophen, tetrathiofulvalen, aza, and diacetylene groups.

It will also be apparent that symmetry is not required, and that asymmetric linkers—that is, linkers with two dissimilar reactive groups—may thus be employed to bond dissimilarly derivatized bonding surfaces. In such circumstances, crosslinking of reactive groups on a single bonding surface will less frequently be encountered.

In one embodiment of the chemistries utilizing asymmetric linkers, a first adherend rendered competent for adhesion by the prior disposition of epoxide groups may be bonded to a second adherend having a gold or platinum surface using mercapto-polyethylene glycol-amine as linker. The linker's free amino group reacts with the epoxide moieties of the first adherend; the linker's mercapto group bonds directly to the gold or platinum surface by dative or coordinate bonding.

This embodiment is particularly useful in the construction of multilaminate devices adapted for detection by optical disk readers, including, but not limited to, the construction of standard (nonmicrofluidic) optical disks. The approach described here obviates the present, discontinuous, approach of sputtering reflective surfaces individually onto the surface of fashioned plastic disk substrates, replacing it with a continuous approach in which metallic or metalized reflective surfaces are applied to such disks instead by adhesion of thin metal foil in a continuous process to be further described below.

In another asymmetric linker embodiment, the linker possesses an epoxide group and a maleimido group. The surface of one adherend is rendered competent for attachment by the addition of amine groups; the surface of the second adherend is rendered competent for adhesion by thiolation. An advantage of this chemistry is that each of the adherend surfaces may separately be prepared by reaction with plasmas. The linker's epoxide moiety reacts specifically with the amine groups of the first adherend's bonding surface; the linker's maleimido group reacts with the thiol groups displayed by the second adherend's surface. The maleimido group of the linker will react specifically with thiol groups in the pH range of 6–7. The epoxide group at the other end of the connector compound reacts with the amino groups when the surfaces are brought into contact. The chemistry can be reversed, so that epoxide and maleimido groups are displayed on the bonding surfaces and the amino and thiol groups are presented by the linker.

In yet another asymmetric embodiment, one of the linker's reactive groups is an epoxy moiety identical in structure to that of bisepoxy-PEG, that is, an oxirane ring wherein the two carbons in the ring are attached to three hydrogens and one carbon, where this latter carbon is part of the PEG backbone. The linker's other reactive group has an oxirane ring wherein one carbon is attached to two hydrogens, and the other carbon is attached to one of the carbons in the PEG backbone but also to a second atom which may be a halogen or a multivalent atom such as oxygen, nitrogen, sulphur, or phosphorus. The carbon atom may be part of any alkyl, alkenyl, alkynyl, or any other hydrocarbon chain that contains one or more higher order bonds and one or more heteroatoms. The reactivity is reduced in the end of the polymer chain containing the substituted oxirane ring due to the increased steric hindrance at the epoxy group. Only the less hindered epoxy group with three hydrogens attached is likely to react in the first reaction. The substituted epoxy group is, however, still reactive enough to form a covalent bond with the second layer when the two layers are compressed again5t each other.

In general, asymmetric linkers may display, as reactive groups, alcohols, amines, carboxylic acids, acid chlorides, isocyanates, epoxides, cyclic amines, activated carbons such as carbanions, carbocations, carbenes, Grignard reagents, or any other carbon atom competent for the formation of carbon-carbon bonds, carbon-nitrogen bonds, carbon-oxygen bonds, carbon-phosphorus bonds, or carbon-sulphur bonds with successive layers or materials that are bonded to the surface of a layer. Some activated reactive groups are formed in situ and are consumed immediately after their formation. Examples of these are carbanions, carbo cations, radicals and carbenes. Some of these are generated photochemically.

In each of the embodiments that include a bifunctional linker, it should also be apparent that uniform application of the linker to one of the two bonding surfaces will, after complete reaction, effectively recreate the geometry first described herein, the bonding surfaces thereby rendered competent to bind directly to one another.

However, a significant advantage of the linker geometry is that nonuniform application of the linker to one of the adherend surfaces creates one or more discrete spots on that surface that is capable of contributing to a bond, surrounded by areas of the adherend surface that are incompetent to bond. The linker may be applied in such instances using any spatially-controllable means, such as by ink jet printing. For example as described in U.S. Pat. Nos. 4,032,929, 4,612,554, and 4,734,705 (Xerox Corporation). Photochemical activation of one or more bonding components allows exact patterning of the bonding region by tunable laser scanner or by photolithographic methods. Examples of photocleavable protective groups are o-nitrobenzyl, 6-nitroveratryloxycarbonyl, and 2-nitrobenzyloxycarbonyl moieties (Barltrop et al., *Chem. Commun.* 822 (1966); Patchornik et al., *J. Am Chem. Soc.* 92:6333 (1970)).

The creation of spatially-directed bonding locations permits "spot-welding" of adherends, which may provide certain structural benefits to the microfabricated object by providing nonbonded areas to relieve stress; this may be particularly useful in devices in which successive lamina expand disparately to application of heat.

Additionally, the creation of spatially-directed bonding locations permits the directed attachment of microfabricated components to the surface of the adherend. Thus, rather than using a double sided tape to affix miniature heating elements as described in WO 98/53311 (Gamera Biosciences), such circuits would be affixed by rendering the circuit's polyester film support competent to bind to a spatially-directed adhesively competent spot on the device substrate.

In rendering a surface competent to contribute a reactant to a bonding reaction—whether the reaction is directly with a moiety disposed upon a second bonding surface or, alternatively, with a reactant disposed upon a bifunctional linker—it is possible to adjust the strength of the resulting surface adhesion by controlling the number of bonds that will ultimately form across the bonding interface. A preferred method for so doing is to adjust the density of reactive moieties on one or both bonding surfaces.

Although a myriad of approaches for adjusting the density of reactive moieties on a bonding surface readily suggest themselves, one preferred approach is to dispose both reactive and nonreactive moieties upon the adherend's bonding surface; the ratio of such reactive to nonreactive moieties determines the effective density of reactive moieties on the surface.

Adhesive strength may also be controlled by adjusting the strength of the individual bonds. Thus, although the foregoing has particularly described formation of covalent bonds, weaker bonds such as ionic bonds, hydrogen bonds, and van der Waal's interactions, may usefully be employed and will lead at any given bond density to commensurately weaker adhesion between the adherends.

It is also possible to choose chemistries that permit the bonding strength to change spontaneously over time or as a consequence of intervention, including continuing usage of the structure. Strengthening of the bond over time may be achieved, for example, by very slow spontaneous reaction between reactive groups, removal of a protecting group, or by polymerization. Such slowly reacting groups may be disposed upon the bonding surfaces in admixture with rapidly bonding reactive groups, permitting an initial rapid bond to be formed, followed by slower curing of the adhesive bond due to the slower-reacting groups.

Conversely, it may be desired to permit weakening of the adhesive bond over time. This may readily be achieved by including a bond that is spontaneously cleavable by light, heat, electricity, water, oxygen, or some other ubiquitous environmental agent. Alternatively, the reactive group may be designed to include an engineered site that is cleavably reactive with an agent to be introduced subsequently. Cleavable moieties are well known in the art; cleavable spacers are further described in International application published as WO 98/01533.

Bonds may also be reversibly cleavable. For example, a sulfur-sulfur bond may be reversibly cleaved by reduction, with the bond forming again upon subsequent oxidation. If one or both of the adherend bonding surfaces is metal, electrochemical reduction and oxidation may be used to effect the reversible attachment or bonding. It thus becomes possible to make a reversible "glue", permitting work pieces to be bonded and detached from each other several times. Applications for such bonds are myriad, and include, inter alia, products which are intended as partially disposable; the permanent and disposable parts may thus be attached for use, and then readily disassembled for disposal. Among such devices, analytical devices that contact patient samples will advantageously make use of such reversible bonding.

Bond formation may proceed directly upon contact of the reactive moieties, as with contact adhesives, or may alternatively be facilitated by further application of a thin solvent layer to one or both bonding surfaces. Without wishing to be bound by theory, the evaporation of such a solvent layer may act, as in wafer bonding techniques described by Kish et al., U.S. Pat. No. 5,783,477, to hold the adherend surfaces together by van der Waals forces during formation of stronger chemical bonds between the reactants. Alternatively or additionally, such a fluid layer may permit the reaction to proceed more efficiently in the fluid phase.

Additionally, the adhesive process may profitably be performed under vacuum. This precludes air bubbles from forming in the bonding interface. Following contact of the adherends under vacuum, the laminate is returned to ambient air pressure where the air pressure further compresses the layers. An alternative solution to the entrapment of gas in the bonding interface, proposed in WO 98/32535 (Lindberg et al.), may readily be adapted to the present adhesive approach.

Continuous Lamination Methods

A significant advantage of the adhesion methods of the present invention is that they particularly facilitate the manufacture of multilaminate structures by a continuous process. In other aspects, therefore, the present invention provides methods and apparatuses for the rapid, continuous manufacture of multilaminate structures.

Three particular advantages of the above-described adhesion methods in continuous processes have already been discussed.

First, separately rendering the bonding surfaces of two adherends competent for adhesion permits the creation of adhesively competent surfaces that are non-self-reactive. Taking the epoxyamine bonding reaction depicted in FIG. 1 as an example, the animated bonding surface will not adhere to itself. Where such an animated adherend is a flexible sheet, such as a thin plastic film, the adherend may as a consequence be reversibly rolled upon itself without self-adherence.

Figure 2:
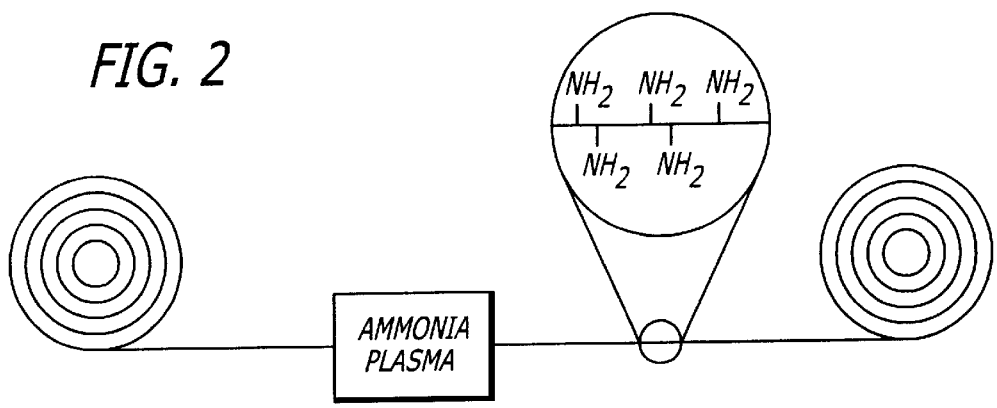
FIG. 2 depicts the use of ammonia plasma to dispose reactive amine groups at high density on the surface of a first adherend via a continuous process, rendering the first adherend competent to contribute to the bonding reaction set forth in FIG. 1.

Second, preferred chemistries for derivatizing the bonding surfaces may be performed using gas plasmas. In particular, animation may be achieved by exposure of the bonding surface to anhydrous ammonia plasma, a process that may readily be performed by continuous feed. Thermal Conversion Corporation manufactures a continuous-feed, gas-phase reactor that is particularly useful for such purposes. FIG. 2 shows an illustrative adherend, formed as a flexible film, passing continuously through a plasma reactor for animation, followed by subsequent rolling of the adherend for storage or further processing.

Third, each distinct surface of an adherend—in the continuous process described here, typically each of two sides of an adherend formed as a film or sheet—may be separately and distinctly derivatized, permitting the directed construction of multilaminate devices.

Figure 3:
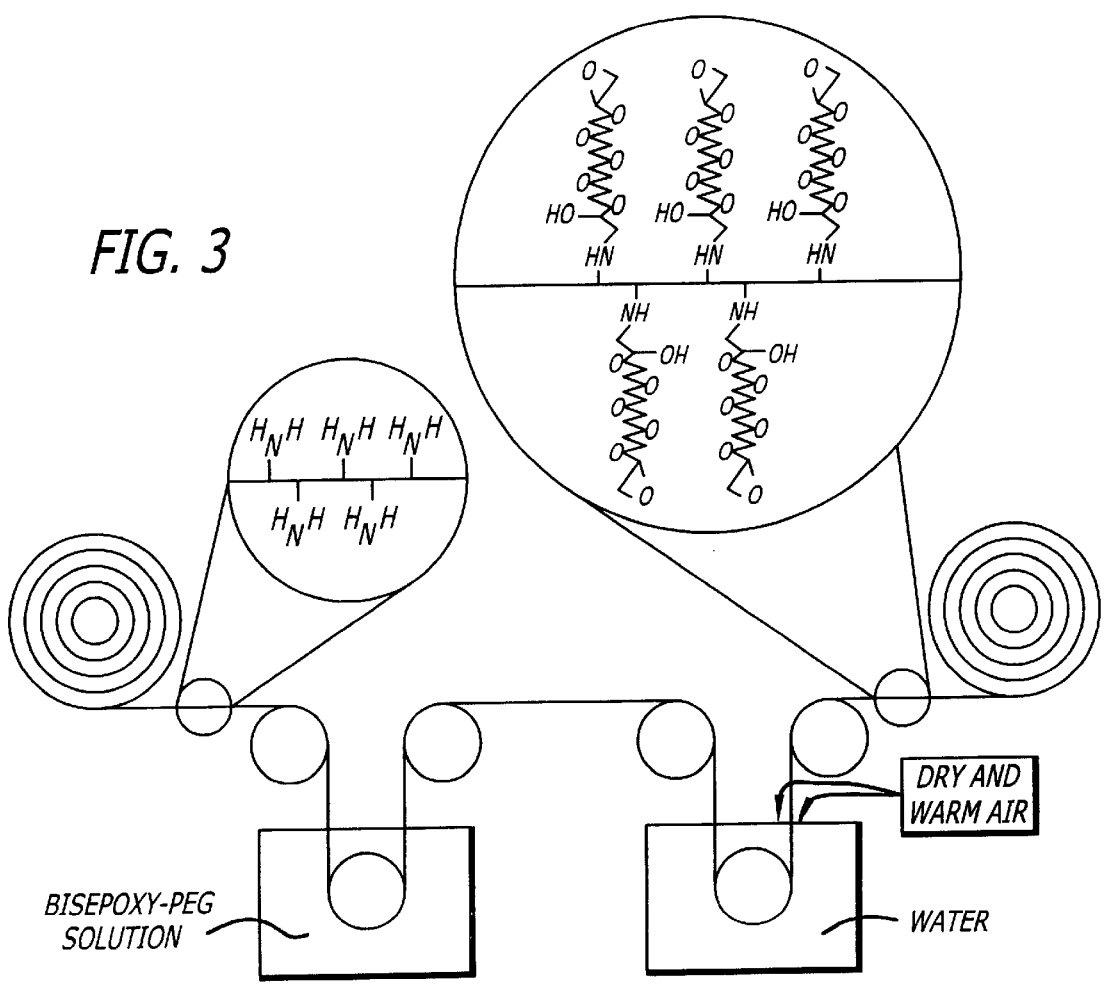
FIG. 3 depicts a continuous process for disposing reactive epoxide groups at high density on the surface of a second adherend, rendering the second adherend competent to bond directly to an adherend prepared as in FIG. 2.

FIG. 3 illustrates that even those reactive groups that are not themselves amenable to deposition directly by gas plasma may be applied using a continuous process. Starting with an adherend that has been animated by passage through ammonia plasma (as depicted, e.g., in FIG. 2), epoxide groups may readily be disposed thereon by passage through a solution of bis-epoxy-polyethylene glycol (bis-epoxy-PEG). The concentration of bis-epoxy-PEG is sufficiently high as to prevent crosslinking of the amine groups. Subsequent rinse with water or other aqueous or nonaqueous solvent, also by continuous passage through a bath, removes unbound and non-specifically bound bifunctional linker. The concentration of bisepoxy-PEG may be monitored, either continuously or periodically, to permit replenishment sufficient to maintain the required concentration. After drying, the epoxidated adherend, which is non-self-reactive, may again be rolled.

Figure 5:
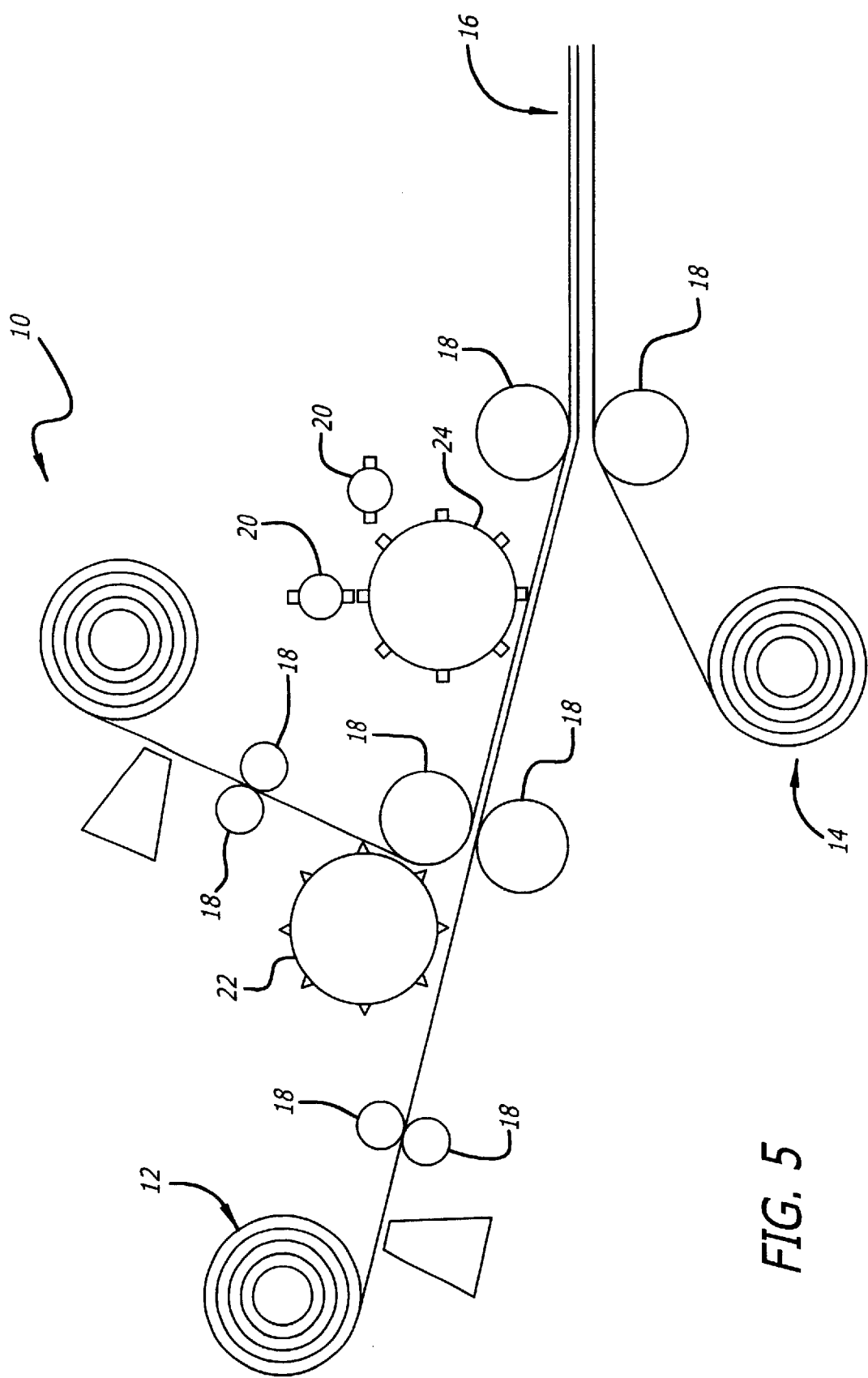
FIG. 5 is a side view of an apparatus for continuous manufacture of a trilaminate structure.

Thereafter, as shown in FIG. 5, the separately derivatized adherends may be brought into adhesive contact to create a multilaminate structure via a continuous process.

Assuming for purposes of illustration the use of the epoxyamine chemistries illustrated in FIGS. 1, 2 and 4 in the continuous manufacturing process of FIG. 5, animated adherends 10 and 14, when brought into contact with epoxidated adherend 12 by means of roller means 18 and drive means 22, will form a trilaminar sheet 16. Although not shown, trilaminar sheet 16 may optionally be rolled upon itself to permit storage or further processing. Such further processing may include further iterations of the preceding steps; if adherends 10 and 14 had been animated on both sides, trilaminar sheet 16 will present animated first and second surfaces that are competent for further adhesive reaction, e.g., with epoxidated surfaces. As would be understood, the orientation of the chemical groups may be reversed, with adherends 10 and 14 presenting epoxide groups and adherend 12 presenting primary reactive amines. And as would be further understood, the continuous process may utilize any of the chemistries described herein.

The continuous manufacturing process shown in FIG. 5—in which adherends separately rendered competent to contribute binding reactants are thereafter continuously and progressively brought into adhesive contact with one another—preferably utilizes adherends that may flexibly be manipulated, as shown in FIG. 5, although nonflexible adherends may also be used with suitable modification of the engagement means. Flexible adherends also permit adhesion to be effected between bonding surfaces contributed by a single adherend, for example by folding or rolling of the adherend upon itself.

For continuous manufacture of multilaminate microfluidic devices or of multilaminate nonfluidic optical disks, one or more of the adherends may be formed from plastic, such as polyethylene, polypropylene, polyacrylate, polymethylmethacrylate, polyvinylchloride, polytetrafluoroethylene, polystyrene, polycarbonate, polyacetal, polysulfone, celluloseacetate, cellulosenitrate, or mixtures thereof. One or more adherends may also be composed of metal foil, such as foil comprising gold, platinum, aluminum, nickel, copper, silver, tin, or alloys thereof, or may alternatively be comprised of insulators, such as silicone, rubber, or various elastomers. Ceramic materials, such as glass or mica, may also be part of the laminate. Ceramic materials are advantageously precut before lamination.

Preferably, each adherend, formed as a sheet (lamina), ranges in depth from 1 nm to 5 cm, more advantageously between 10 nm and 1 cm, even more advantageously between 100 nm and 5 cm, and most advantageously between 1 $\mu$m–1.0 mM. For devices that are adapted to be accommodated in standard optical disk readers, the total thickness of a completed multilaminate structure should range from about 0.1–2.5mm, preferably from about 0.5–1.5 mm, most preferably from about 0.8–1.5 mm, with a depth of about 1.2 mm being optimal.

Although not shown in FIG. 5, laminae may optionally be attached by other methods, such as vapor deposition, sputtering, evaporation, ink jet deposition, spraying, bath immersion, application of liquid solution, or the like.

Furthermore, separately manufactured components, such as miniaturized heaters, electrodes, analytical elements, and the like, may also be applied; as earlier discussed, such application may itself advantageously, but need not necessarily, utilize the adhesion techniques of the present invention. Analyte-specific signal elements, such as are described, inter alia, in International published as application WO98/37238, may also be attached at desired locations of one or more laminae.

Building multilaminate structures using the present techniques permits the ready creation of three-dimensional microfluidic networks of determinate structure.

Figure 6:
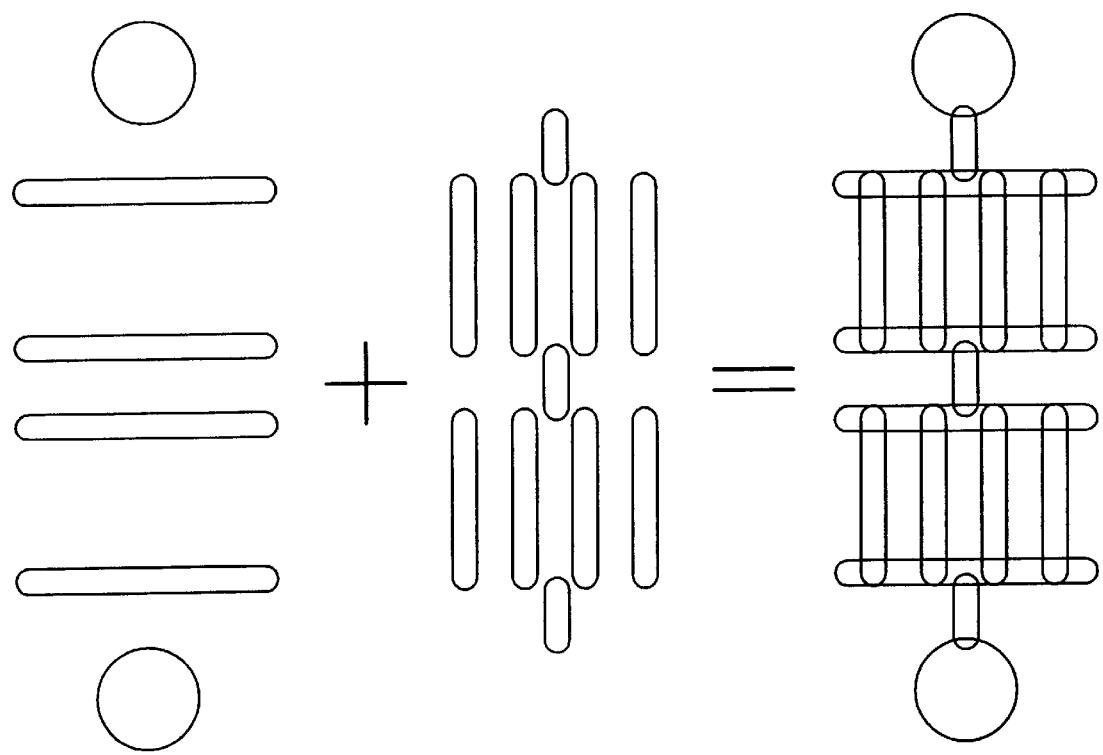
FIG. 6 is an exploded perspective view of a laminated structure in which superimposition of patterned laminae creates fluidly sealed determinate microfluidic paths.

Thus, nonplanarities may be etched or otherwise machined independently into one or more laminae using known microfabrication techniques, such as photolithography and wet chemical or plasma etching, excimer laser ablation, or the like. Such indentations may extend through the entire width of the lamina, creating patterned voids (through-holes) therein; superimposition of such voids in successive laminae may then be used to create a three dimensional network of channels, canals, slits, grooves, capillaries and the like in any desired orientation. FIG. 6 illustrates the creation of fluidly connected channels by such registrable superimposition of channels separately cut in two successive laminae.

Creation of such three dimensional microfluidic networks requires that the successive laminae be adhered in exact registration with adjacent laminae. A number of approaches may be used to effect this registration including, but not limited to, the guidepin and depression method set forth in Schmidt et al., U.S. Pat. No. 5,698,299.

Although particularly described as advantageous in the manufacture of microfluidic networks, microfabrication of nonplanarities into one or more laminae may be used alternatively or additionally to encode information readable by an optical disk reader. In standard optical disk manufacture, such pits and grooves are impressed during injection molding of thermoplastic substrates, such as polycarbonate.

The continuous lamination method described here contemplates that any desired patterning of a lamina may be repeated at intervals along the longitudinal axis of the laminar sheet, that is, along the axis defined by the path of the adherend progressively through the manufacturing device; individual multilaminate structures are then completed by periodic excision of individual structures from the iterated multilaminate structure.

In one preferred embodiment, these individual multilaminate structures are disks, such as those described in International counterpart applications published as WO 98/01533, WO 98/37238, and WO 98/38510, which are incorporated herein by reference. The disks typically will have a diameter between 5 mM and 500 mM, more advantageously 10 mM–250 mM, and most advantageously 50 mM–150 mM. A particularly advantageous geometry for these disks is that set forth in the CD and DVD standards—that is, nominally 120 mM in diameter and 1.2 mM in thickness—thus allowing such disks to be accommodate in standard optical disk readers and recorders.

All patents, patent publications, and other published references mentioned herein are hereby incorporated by reference in their entirety as if each had been individually and specifically incorporated by reference herein.

While preferred illustrative embodiments of the present invention are described, it will be apparent to one skilled in the art that various changes and modifications may be made therein without departing from the invention, and it is intended in the appended claims to cover all such changes and modifications that fall within the true spirit and scope of the invention.

What is claimed is:

1. A method of providing one or more chemical reactants within a microfluidic channel or microfluidic chamber when attaching a first surface to a second surface to form such a microfluidic channel or microfluidic chamber located between said first and second surfaces, said method comprising:

contacting said first surface with said second surface, said first surface having a first bonding surface and a recessed surface defining a first channel or chamber wall and said second surface having a bonding surface and a recessed surface defining a second channel or chamber wall, said contacting including aligning said first wall and said second wall in registration therewith;

a first reactant for a chemical bonding reaction being present on said first surface including said first bonding surface and said first wall, a second reactant for said chemical bonding reaction being present on said second surface including said second bonding surface and said second wall, and said surfaces being contacted for a time and under conditions sufficient to permit said chemical reaction to bond sufficient first reactant to said second reactant to attach said first bonding surface to said second bonding surface; said first and second walls forming a microfluidic channel or microfluidic chamber located between said first and second surfaces, said first reactant on said first wall and said second reactant on said second wall not undergoing said chemical bonding reaction.

2. The method of claim 1, further including the antecedent step of:

disposing upon said first surface a plurality of said first reactant.

3. The method of claim 2, further including the step, prior to said contacting step, of:

disposing upon said second surface a plurality of said second reactant.

4. The method of claim 2 or claim 3, wherein said step of disposing includes exposure of said surface to a gas plasma.

5. The method of claim 4, wherein said plasma is selected from the group consisting of ammonia plasma, oxygen plasma and halogen plasma.

6. The method of claim 5, wherein said plasma is ammonia plasma.

7. The method of claim 1, wherein the chemical bond formed in said bonding reaction is selected from the group consisting of covalent bond, hydrogen bond, ionic bond, metallic bond, and dative bond.

8. The method of claim 7, wherein the chemical bond formed in said bonding reaction is a covalent bond.

9. The method of claim 7, wherein the chemical bond formed in said bonding reaction is a dative bond.

10. The method of claim 9, wherein at least one of the reactants is a metal.

11. The method of claim 10, wherein said metal is gold.

12. The method of claim 10, wherein said metal is platinum.

13. The method of claim 1, wherein at least one of said reactants is a primary amino group.

14. The method of claim 1, wherein at least one of said reactants is an epoxide group.

15. The method of claim 14, wherein said reactant is an epoxide of formula I:

each R is either attached to an adherend or remains unattached and each R is independently selected from the group of hydrogen, (C1–C1000)—straight or branched alkyl, (C2–C1000)—straight or blanched alkenyl or alkynyl, and Cyc;

each hydrocarbon is optionally substituted withup to 500 substituents selected from Cyc any one of the CH groups of said alkenyl groups being optionally replaced by N and any one of the $CH_2$ groups of said hydrocarbon chains being optionally replaced by Cyc or by a heteroatom selected from the group of O, S, SO, $SO_2$, and $NR^1$;

$R^1$ being selected from the group of c1–C10)—straight or branched alkyl, (C2–C10)—straignt or branched alkenyl or alkynyl, 0-(C1–C10) straight or branched alkys, 0-(C2–C10)—straight or branched alkenyl or alkynyl, benzyl, phenyl, hydroxyl, and hydrogen; and Cyd being selected from the group of any mono- or by-cyclic ring system with individual rings being 5–7 membered each ring optionally containing in either or both rings 1–4 heteroatoms selected from O, S, N, NH, SO or $SO_2$ each ring optionally containing 1–3 double bonds, and each ring 1–3 optionally containing substituents which are independently selected from the group of $R^1$, halogen, hydroxymethyl, nitro, trifluoromethyl, trifluoromethyl, trifluoromethoxy, N-, O-benzyl, O-phenyl, 1,2-methylenedioxy, amino and carboxyl.

16. The method of claim 14, wherein said epoxide is disposed upon said bonding surface by the steps, in order, of:

aminating said bonding surface, then reacting said surface with bis-epoxy-PEG.

17. The method of claim 1, wherein at least one of said bonding surfaces is of an adherend being essentially plastic.

18. The method of claim 17, wherein said plastic is selected from the group of polyethylene, polypropylene, polyacrylate, polymethylmethacrylate, polyvinylchloride, polytetrafluoroethylene, polystyrene, polycarbonate, polyacetal, polysulfone, celluloseacetate, and cellulosenitrate.

19. The method of claim 18, wherein said plastic is polycarbonate.

20. The method of claim 1, wherein at least one of said bonding surfaces is of an adherend being essentially metal.

21. The method of claim 20, wherein said metal is gold.

22. The method of claim 20, wherein said metal is silver.

23. The method of claim 20, wherein said metal is copper.

24. The method of claim 20, wherein said metal is platinum.

25. The method of claim 1, wherein at least one of said bonding surfaces is of an adherend essentially silicon.

26. The method of claim 1 wherein at least one of said bonding surfaces includes a plurality of nonplanarities at the bonding interface between said bonding surfaces.

27. The method of claim 26, wherein said nonplanarities digitally encode information.

28. The method of claim 27, wherein said digitally encoded information is readable by an optical disk reader.

29. The method of claim 1, wherein at least one of said recessed surfaces has analyte-specific signal elements disposed thereon.

30. A method according to claim 1 which includes the step of bonding at least one layer to an exterior surface of said bonded first and second surfaces to form a multilaminate structure.

31. A method of direct bonding and fluidly sealing a pair of adherends along a bonding interface between opposing planar surfaces of said adherends wherein at least one of said adherends includes microfluidic features fabricated into its planar surface which are nonplanar with said interface and are to be fluidly sealed by the bonding of the other of said adherends to said one of said adherends, said method comprising:

separately rendering each planar surface of said adherends competent to contribute one of two reactants required for a chemically bonding reaction when placed in contact with each other; and thereafter contacting the planar surfaces of said adherends with each other to cause direct bonding of said substrates and fluid sealing of said microfluidic features.

32. The method of claim 31 wherein at least one of said adherends is made of plastic and is rendered competent to contribute said one of two reactants by incorporating said one of two reactants in said one of said adherends during polymerization of the plastic of said one of said adherends.

33. The method of claim 31 wherein at least one of said adherends is rendered competent to contribute said one of two reactants by the depositing of said one reactant upon said adherend by derivatization of the planar surface of said one of said adherends.

34. The method of claim 31 including the sub-step of chemically protecting at least one of said reactants after said step of rendering and removing said chemical protection before said step of contacting.

35. The method of claim 31 wherein said feature is a microfabricated capillary or chamber which is fully enclosed by said adherends being bonded together and include said reactants as unreacted due to spatial separation thereof.

36. The method of claim 35 including the step of introducing one or more of the group biological molecules, antibodies, analyte-specific signal elements readable by an optical disk reader, and plastic spheres into one or more of said microfluidic features for attachment to reactant therein before or after contacting of the planar surfaces of said adherends to each other.

37. The method of claim 31 wherein at least one feature fabricated in a planar surface of said one of said adherends includes pits and grooves that digitally encode information readable by an optical disk reader.

38. The method of claim 31 wherein a feature fabricated in a planar surface of said one of said adherends includes a metal foil for digitally encoding information readable by an optical disk reader.

39. The method of claim 31 wherein at least one of said adherends is selected from the group of plastic, metal, gold and metal foil.

40. The method of claim 31 wherein said microfluidic features which are non-planar with said bonding interface of said adherends include one or more of the group microfluidic devices, fluid flow channels, reaction chambers, modular assay units, microelectrodes, microchannels, wells, capillaries and microfluidic laboratories.

41. The method of claim 31 wherein the reactants are provided in association with said adherends to adhere the adherend opposing planar surfaces monomolecularly with just a single molecule bridging the bonding interface between said adherends.

42. The method of claim 31 wherein said reactants are chosen to permit the bonding strength thereof between said adherends to change spontaneously over time or as a consequence of intervention, including continuing usage of the structure.

43. The method of claim 31 wherein said reactants are chosen to permit the bonds to be weakened or reversed by including bonds that are cleavable.

44. The method of claim 31 wherein said rendering of each planar surface of said substrate competent to contribute one of two reactants is performed under a vacuum.

45. The method of claim 31 wherein said pair of adherends comprise a pair of macroscopic adherends.

46. The method of claim 31 wherein said rendering includes exposure of the surface of at least one of said adherends to a gas plasma.

47. The method of claim 46 wherein said plasma is selected from the group consisting of ammonia plasma, oxygen plasma and halogen plasma.

48. The method of claim 47 wherein said plasma is ammonia plasma.

49. The method of claim 31 wherein the chemical bond formed in said bonding reaction is selected from the group of covalent bond, hydrogen bond, ionic bond, metallic bond and dative bond.

50. The method of claim 49 wherein the chemical bond formed in said bonding reaction is a covalent bond.

51. The method of claim 49 wherein the chemical bond is formed in said bonding reaction is a dative bond.

52. The method of claim 51 wherein at least one of the reactants is a metal.

53. The method of claim 52 wherein said metal is gold.

54. The method of claim 52 wherein said metal is platinum.

55. The method of claim 31 wherein at least one of said reactants is a primary amino group.

56. The method of claim 31 wherein at least one of said reactants is an epoxide group.

57. The method of claim 56 wherein said epoxide is disposed upon a said surface of said surfaces by the steps in order of:

animating said surface, then reacting said surface with bis-epoxy-PEG.

58. The method of claim 31 wherein at least one of said adherends is composed essentially of metal.

59. The method of claim 58 wherein said metal is gold.

60. The method of claim 58 wherein said metal is silver.

61. The method of claim 58 wherein said metal is copper.

62. The method of claim 58 wherein said metal is platinum.

63. The method of claim 31 wherein at least one of said surfaces is of an adherend consisting essentially of silicon.

64. The method of claim 31 wherein at least one of said surfaces includes a plurality of nonplanarities along the bonding interface of said adherends.

65. The method of claim 64 wherein the other of said surfaces fluidly encloses said nonplanarities.

66. The method of claim 64 wherein said nonplanarities digitally encode information.

67. The method of claim 66 wherein said digitally encoded information is readable by an optical disk reader.

68. The method of claim 31 wherein said adherends are substrates of an optical disk and have analyte-specific signal elements associated therewith.

69. The method of claim 68 wherein said analyte-specific signal elements are readable by an optical disk reader.

70. The method for constructing a multilaminate structure, the method comprising at least one iteration of the method of claim 31.

71. A method of providing reactants within channels and/or chambers of an optically readable microfluidic assay disk have digitally encoded information for conducting an assay of assay elements such as analyte specific elements, biological molecules, such as antibodies, and/or biological particles and/or samples, said method comprising:

providing a first reactant for a chemical bonding reaction on a first bonding surface of a first substrate of said disk, said first bonding surface having microfluidic nonplanarities formed therein;

providing a second reactant for said chemical bonding reaction on a second bonding surface of a second substrate of said disk;

contacting said first bonding surface with said second bonding surface to bond said first substrate to said second substrate along a bonding interface of said surfaces and fluidly sealing said microfluidic nonplanarities with a portion of said first sealant associated with said microfluidic nonplanarities and a portion of said second reactant on said second bonding surface opposing said microfluidic nonplanarities not undergoing a chemical bonding reaction with another by virtue of a spatial separation thereof; and attaching any one or more of the group including analyte specific signal elements, biological molecules including antibodies, biological cells, biological particles and biological samples to one or both of said first and second reactants associated with said microfluidic nonplanarities before or after the contacting of said bonding surfaces.

72. A method of providing assay elements selected from the group including biological particles, molecules and/or samples, chemical reactants and signal elements within channels and/or chambers within an optically readable assay disk having digitally encoded information therein for use in conducting an optical inspection of said assay disk comprising:

providing a first reactant for a chemical bonding reaction on a first bonding surface of a first substrate of said disk;

providing a second reactant for said chemical bonding reaction on a second bonding surface of a second substrate of said disk;

one or both of said first and second bonding surfaces having microfluidic nonplanarities inclusive of at least channels and/or chambers formed in said surface, said microfluidic nonplanarities having at least one of said reactants associated therewith;

contacting said first bonding surface with said second bonding surface to bond said first substrate to said second substrate along a bonding interface of said surfaces and fluidly seal said microfluidic nonplanarities with a portion of said first reactant associated with said microfluidic nonplanarities and a portion of second reactant associated with said second bonding surface opposing said microfluidic nonplanarities not undergoing a chemical bonding reaction with each other by virtue of a spatial separation thereof; and attaching one or more of said assay elements to reactants present on said bonding surfaces at said microfluidic nonplanarities which have not undergone a chemical bonding reaction before or after contacting said first bonding surface to said second bonding surface.

\* \* \* \* \*